United States Patent [19]

Inoue et al.

[11] Patent Number: 5,124,737
[45] Date of Patent: Jun. 23, 1992

[54] DEVICE FOR CONTROLLING A MOVABLE MEMBER

[75] Inventors: Manabu Inoue; Hiroyuki Okada; Yoshiaki Hata; Ikushi Nakamura, all of Osaka, Japan

[73] Assignee: Minolta Camera Kabushiki Kaisha, Osaka, Japan

[21] Appl. No.: 660,268

[22] Filed: Feb. 26, 1991

Related U.S. Application Data

[63] Continuation of Ser. No. 346,078, May 2, 1989, abandoned.

[30] Foreign Application Priority Data

May 4, 1988 [JP] Japan .................. 63-59611
May 4, 1988 [JP] Japan .................. 63-109748

[51] Int. Cl.$^5$ .......................................... G03B 13/00
[52] U.S. Cl. ........................... 354/400; 354/187; 354/195.12
[58] Field of Search ............ 354/195.1, 195.12, 187, 354/171, 173.1, 214, 412, 400–409; 318/596, 630, 672

[56] References Cited

U.S. PATENT DOCUMENTS

| | | | |
|---|---|---|---|
| 4,412,164 | 10/1983 | Ohnuma | 318/596 |
| 4,714,363 | 12/1987 | Minowa | 318/672 |
| 4,728,977 | 3/1988 | Yomogizawa et al. | 354/195.1 |
| 4,806,961 | 2/1989 | Kamitani et al. | 354/195.1 |
| 4,814,813 | 3/1989 | Yamamoto et al. | 354/418 |
| 5,008,605 | 4/1991 | Ohara et al. | 354/400 |

FOREIGN PATENT DOCUMENTS

58-202432 11/1983 Japan .
61-88120 6/1986 Japan .
61-267719 11/1986 Japan .

OTHER PUBLICATIONS

Article entitled "Camera Test" from Japanese Magazine entitled Shashin Kogyo (Photography Industry), pp. 74-89, Feb. 1987.

Primary Examiner—L. T. Hix
Assistant Examiner—David M. Gray
Attorney, Agent, or Firm—Willian Brinks Olds Hofer Gilson & Lione

[57] ABSTRACT

A device for controlling a stop position of a movable member includes a movable member movable as far as a specified stop position, drive means for moving the movable member, detection means for detecting that the movable member reaches the specified stop position, timer means for setting a specified time, and control means responsive to detection means for suspending the drive means when the movable member reaches the specified stop position, setting the timer means, then allowing the drive means to drive again until the set time elapses. Also, a device for controlling a lens position of a camera includes a lens setable at one of a projected state and a retracted state, change means for changing the lens from the projected state to the retracted state and vice versa, detection means for detecting that a loaded film is wound by the tail portion, discrimination means for discriminating whether the lens is set in the projected state, rewinding means at least responsive to the detection means for rewinding the wound film when the loaded film is wound by the tail portion, and control means responsive to the detection means, the discrimination means, and the rewinding means for controlling the change means so as to return the lens to the retracted state.

48 Claims, 8 Drawing Sheets

DEVICE FOR CONTROLLING A MOVABLE MEMBER

This application is a continuation of application Ser. No. 07/346,078, filed May 2, 1989 now abandoned.

BACKGROUND OF THE INVENTION AND RELATED ART STATEMENT

The present invention relates to a device for controlling a movable member which is applicable for controlling a stop position of a movable lens of a focal length changeable type camera, and also applicable for controlling a lens position of a focal length changeable type camera of rear converter type.

Widely has been used a camera carrying a taking lens capable of changing the focal length. In such a focal length changeable lens camera, it is usual to move a movable lens by use of an internally equipped motor in response to switching operation. Specifically, a lens position detection switch detects that the movable lens reaches a specified stop position (i.e. end position) of a telephoto focal length state, standard focal length state, or wide angle focal length state. Subsequently, the internally equipped motor is suspended or driven in response to outputs of the switch.

In such a focal length changeable lens camera, also, it has been required to change the focal length in prompt response to photography purposes. Therefore, the movable lens is moved at high speed so that a rapid change in focal length is attainable. It could be seen that even if the movable lens has a small weight, the movable lens has a considerably great momentum. Accordingly, even when the movable lens is stopped immediately after the lens position detection switch detects that the lens reaches the specified stop position, there is a likelihood that the movable lens rebounds at the specified stop position and stops at a position before the specified stop position. Consequently, there is a likelihood that a designed photography performance can not be obtained due to the positional error of the movable lens.

Also, in such a focal length changeable lens camera, changing the focal length changes the projection amount of the lens. In a focal length changeable type camera of rear converter type when the focal lens is set in the telephoto focal length state, the projection amount of the lens is considerably great. This is because the lens must be projected corresponding to an amount in which a rear converter lens is introduced behind the lens retracted. When a loaded film is not wound by the tail portion, it is usual that the lens is required to be set not only in the standard focal length state (or wide angle focal length state), i.e., a retracted state but also in the telephoto focal length state, i.e., a projected state. When the film is wound by the tail portion, there are few occasions that the lens is required to be set at the projected state. Also, when the wound film is rewound, there are few occasions that the lens is required to be set at the projected state. It could be seen that a considerably projected lens lowers the portability of the camera. Accordingly, it is desired that when the camera is not put into work and is carried, the lens be set in the retracted state.

As mentioned above, in such focal length changeable lens cameras, it is usual to move the movable lens by use of an internally equipped motor in response to switching operation. Furthermore, it is usual in such a camera that all the switches of the camera are not allowed to operate during the time from start of the film rewinding operation to opening of the rear cover. Accordingly, there is a disadvantage that when the film rewinding operation is started with the lens being set in the projected state, the lens can not be set from the projected state to the retracted state until the film rewinding operation is completed and the rear cover is opened. Even if the lens is made changeable from the projected state to the retracted state even after starting of the rewinding operation, there is another disadvantage that the lens moves uselessly in spite of the state that photography is unexecutable.

SUMMARY OF THE INVENTION

The present invention has worked out to overcome the above-mentioned drawbacks. It is an object of the present invention to provide a device for controlling a stop position of a movable member which makes it possible to stop the movable member at a specified stop position with an increased accuracy. It is another object of the present invention to provide a device for controlling a lens position of a camera which makes it possible to automatically return the lens to a retracted state when the film is wound by the tail portion or rewinding operation is started.

A first device of the present invention comprises a movable member movable as far as a specified stop position, drive means for moving the movable member, detection means for detecting that the movable member reaches the specified stop position, timer means for setting a specified time, and control means responsive to the detection means for suspending the drive means when the movable member reaches the specified stop position, setting the timer means, then allowing the drive means to drive again until the set time elapses.

Accordingly, the first device in which the drive means is temporarily suspended when the movable member reaches the specified stop position, a specified time being set, the drive means being then driven again until the set time elapses makes it possible to eliminate the movable member from rebounding at the specified stop position and consequently to stop the movable member at the specified stop position accurately.

A second device of the present invention comprises a lens setable at one of a projected state and a retracted state, change means for changing the lens from the projected state to the retracted state and vice versa, detection means for detecting that a loaded film is wound by the tail portion, discrimination means for discriminating whether the lens is set in the projected state, rewinding means at least responsive to the detection means for rewinding the wound film when the loaded film is wound by the tail portion, and control means responsive to the detection means, the discrimination means, and the rewinding means for controlling the change means so as to return the lens to the retracted state.

Accordingly, the second device in which the lens is returnable to the retracted state when the loaded film is entirely wound by the tail portion or the rewinding operation is started makes it possible to eliminate the disadvantage that the lens is in the projected state when photography is unexecutable for film replacement or other reasons and consequently set the camera in a compact form when not used. Also, the second device can eliminate the above-mentioned disadvantage that when the film rewinding operation is started with the lens being in the projected state, the lens can not be returned to the retracted state until the film rewinding operation is completed and the rear cover is opened. Further, the second device can eliminate the above-mentioned disadvantage that the lens moves in spite of the state that photography is unexecutable.

These and other objects, features and advantages of the present invention will become more apparent upon a reading of the following detailed description and drawings.

BRIEF DESCRIPTION OF THE DRAWINGS

FIG. 6 is a flowchart showing a film rewinding subsequence of the camera, circled A in FIG. 6 being connected with the circled A in FIG. 4a; and FIG. 7 is a flowchart showing another film rewinding subsequence of the camera, circled A in FIG. 7 being connected with the circled A in FIG. 4a.

DETAILED DESCRIPTION OF PREFERRED EMBODIMENTS

Figure 1:
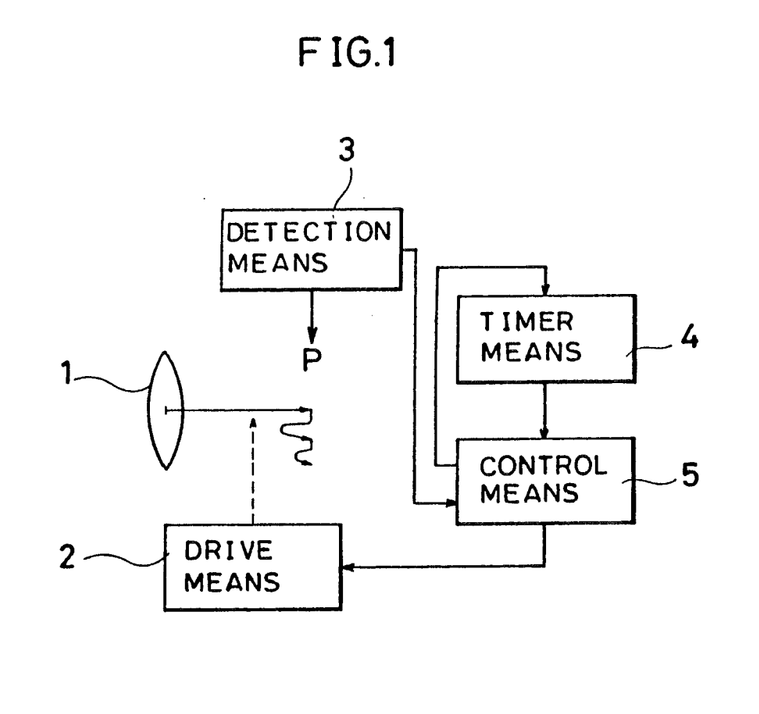
FIG. 1 is a block diagram showing a basic construction of a device of the present invention.

Referring to FIG. 1, firstly, a device of the present invention basically comprises a movable member 1 movable as far as a specified stop position P but immovable beyond the specified stop position P, drive means 2 for moving the movable member 1, detection means 3 for detecting that the movable member 1 reaches the specified stop position P, timer means 4 for setting a specified time, and control means 5 for suspending the drive means when the movable member 1 reaches the stop position P, setting the timer means 4 at the specified time, and allowing the drive means to drive again until the specified time elapses.

The movable member 1 is moved to and stopped at the specified stop position P in the following way. The timer means 4 and the control means 5 are not put into operation and the drive means 2 continues to move the movable member 1 until the movable member 1 reaches the specified stop position P. When the detection means 3 detects that the movable member 1 reaches the specified stop position P, the control means 5 suspends the drive means 2 in response to the detection means 3 and simultaneously sets the timer at the specified time. After the timer means 4 is set, the drive means 3 is put into operation again. After the lapse of the specified time, i.e., the timer means 4 comes to a stop and the drive means 2 is then suspended again.

In other words, when the movable member 1 reaches the specified stop position P, the drive means 2 is temporarily stopped and then put into operation again for the specified time. Accordingly, it could be seen that even if the movable member rebounds at the specified stop position, the movable member can be stopped at the specified stop position owing to the fact that the movable member 1 is moved to the specified stop position P for the specified time.

It could be seen that there is a likelihood that in the above-mentioned re-movement, the movable member 1 repeatedly rebounds at the specified stop position P. However, the momentum of the movable member 1 decreases as time passes and the oscillation consequently dampens. Accordingly, it will be theoretically apparent that the longer the specified time is set, the closer the movable member is stopped to the specified stop position P. However, it is practical to set the specified time at such a time as to assure an intended stop accuracy.

Figure 2:
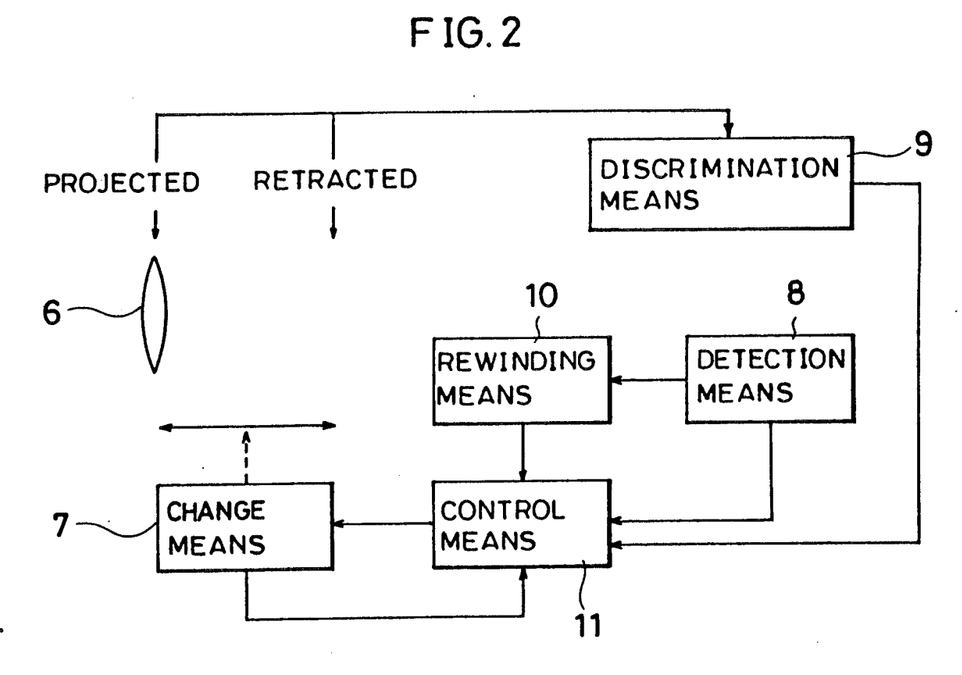
FIG. 2 is a block diagram showing a basic construction of another device of the present invention.

Next, referring to FIG. 2, another device of the present invention comprises a lens 6 setable in one of a projected state and a retracted state, change means 7 for changing the lens 6 from the projected state to the retracted state and vice versa, detection means 8 for detecting that a loaded film is wound by the tail portion, discrimination means 9 for discriminating whether the lens 6 is in the projected position, rewinding means 10 at least responsive to the detection means 8 for rewinding the film when the loaded film is wound by the tail portion, and control means 11 responsive to the detection means 8, the discrimination means 9, and the rewinding means 10 for controlling the change means 7 so as to return the lens 6 to the retracted state when the lens is set in the projected state after the loaded film is wound by the tail portion or rewinding operation of the wound film is started.

It will be noted that one of the detection means 8 and the rewinding means 9 may be omitted. Specifically, in the case of omitting the detection means 8, the control means 11 is made to control the change means 7 in response to manually operated rewinding. In the case of omitting the rewinding means 10, the control means 11 is made to control the change means 7 in response to the detection means 8.

The second device is operated in the following way. The detection means 8 detects that the loaded film is wound by the tail portion. The rewinding means 10 then starts the rewinding operation in response to the above detection. On the other hand, the control means 11 receives lens state information from the discrimination means 9 and rewinding operation information from the rewinding means 10. If the lens 6 is set in the projected state and the rewinding operation is started, the control means 11 controls the change means 7 so as to return the lens 6 to the retracted position.

In the case of omitting the rewinding means 10, the control means 11 receives lens state information from the discrimination means 9 and film information from the detection means 8. If the lens 6 is set in the projected state and the loaded film is wound by the tail portion, the control means 11 controls the change means 7 so as to return the lens 6 to the retracted state.

In the case of omitting the detection means 8, the control means 11 receives lens state information from the discrimination means 9 and rewinding operation information from the rewinding means 10. If the lens 6 is set in the projected state and the rewinding operation is started, the control means 11 controls the change means 7 so as to return the lens 6 to the retracted state.

Figure 3:
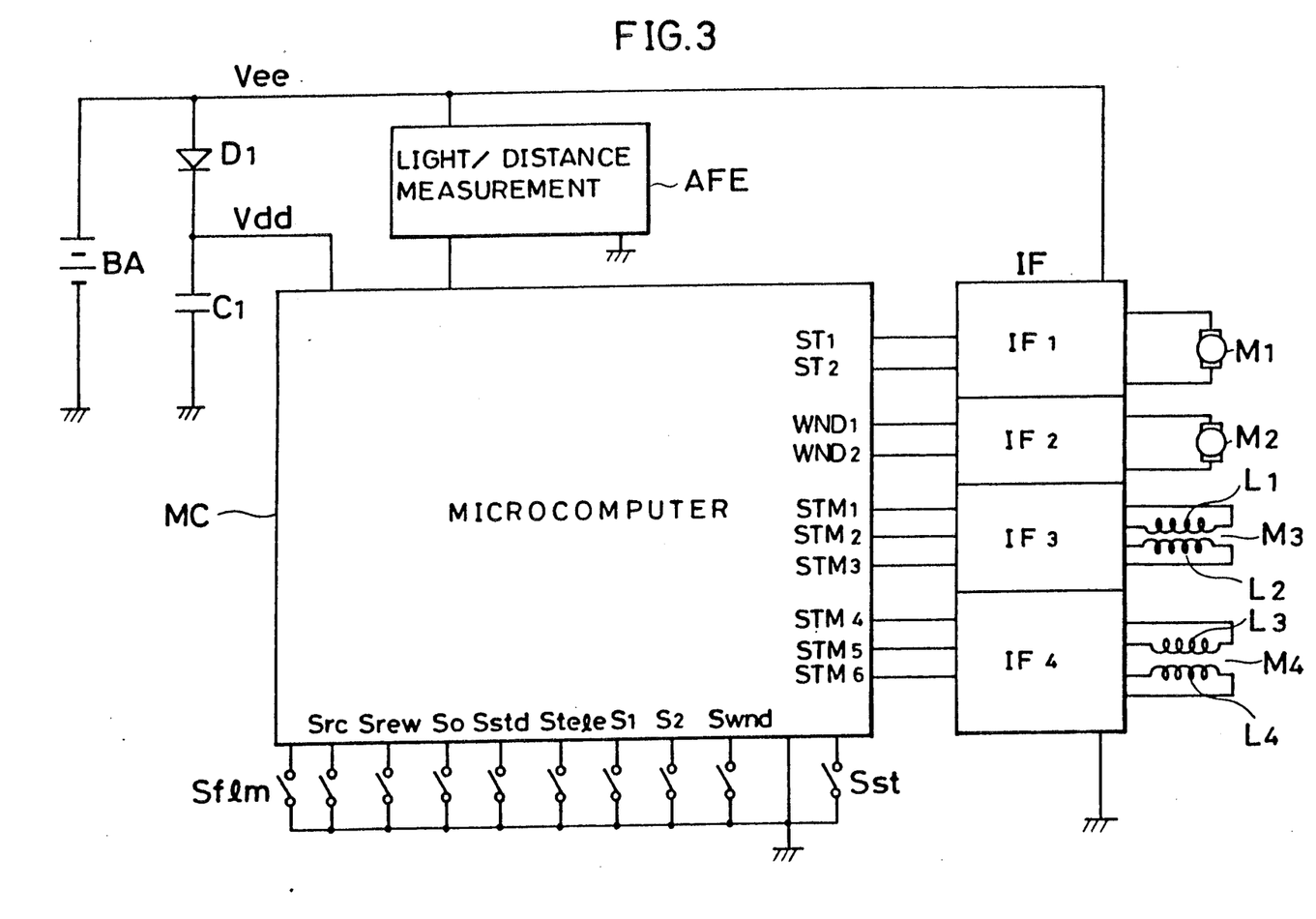
FIG. 3 is a block diagram showing an overall construction of a camera embodying the present invention.

Next, the present invention will be described with reference to FIG. 3 showing a general circuit of a camera embodying the present invention. Indicated at BA is a battery, e.g., a lithium cell. The battery BA is connected with a light/distance measurement circuit AFE for measuring brightness and distance of and to an object to be photographed, and an interface unit IF for controlling motors M1, M2, M3, M4 through a line Vee. Also, a series line of a diode D1 and a capacitor C1 is parallel connected to the battery BA. The cathode line Vdd of the diode D1 is connected to a microcomputer MC.

The capacitor C1 has a relatively great capacitance, so that when the battery is removed to be replaced with a fresh battery, the capacitor C1 can give a supply of electricity to the microcomputer MC through the line Vdd. At this time, the diode D1 keeps an electric current from reversely flowing from the capacitor C1 to the line Vee. Also, it will be seen that when a great amount of electric current flows through the line Vee to drive the motor or other means, the voltage of the line Vee lowers due to the internal resistance of the battery BA. However, the diode D1 keeps an electric current from reversely flowing from the capacitor C1 to the line Vee. Accordingly, the power line Vdd of the microcomputer MC is held at a stabilized voltage, which consequently prevents the microcomputer MC from coming into unintentional stop or uncontrollable states.

The microcomputer MC has a number of input ports respectively connected to a variety of switches which will be described below.

Indicated at Src is a rear cover switch which is turned on or off in accordance with opening and closing of a rear cover of the camera. When the rear cover is opened, the switch Src is turned on. When the rear cover is closed, the switch Src is turned off.

Indicated at Srew is a rewinding switch which is manually actuated when the film is forcefully rewound. The switch Srew is put in the OFF-state in usual time. When the switch Srew is turned on, the rewinding operation of film is started. After starting the rewinding operation, the microcomputer allows the rewinding operation to continue until the film is completely rewound. Even if the switch Srew is turned off, the rewinding operation is maintained until completed.

Indicated at So is a lens barrier switch which is turned on or off in accordance with opening and closing of a lens barrier of the camera. When the lens barrier is put in the opened-state, the switch So is held in the ON-state. When the lens barrier is put in the closed-state, the switch So is held in the OFF-state. When the lens barrier is put in the closed-state, all the photography operations are suspended.

Indicated at S1 is a light/distance measurement switch which is turned on when a release button is pressed down halfway. When the switch S1 is turned on, operation of measuring brightness and distance of and to the object is started.

Indicated at S2 is a release switch which is turned on when the release button is pressed down all the way. When the switch S2 is turned on, a release sequence is started.

Indicated at Sst is a switch for changing the focal length of a taking lens. The switch Sst is put in the OFF-state in usual time. Every turning-on of the switch Sst changes the focal length of the taking lens.

Indicated at Sstd, Stele are switches for detecting the stop position of a movable lens of the taking lens. When the movable lens is set at a standard stop position, e.g., a focal length of 35 mm, the standard stop position detection switch Sstd is turned on. When the movable lens is set at a telephoto stop position, e.g., a focal length of 70 mm, the telephoto stop position detection switch Stele is turned on. In the case that the taking lens is a zoom lens, it may be appropriate to constitute these switches Sstd, Stele by use of a contact of a zoom encoder which is provided on the zoom lens to issue signals concerning focal lengths.

Indicated at Swnd is a switch for detecting one-frame winding of the film. The switch Swnd is operably connected with a film winding sprocket and thereby tuned on every one-frame winding.

Indicated at Sflm is a switch for detecting the presence of a film. The switch Sflm is turned on when the film occupies an image section of the camera.

One of the ends of all the above-mentioned switches are grounded and the other ends are connected to their respective input ports of the microcomputer MC. The other ends connected to the input ports are pulled up in the microcomputer MC. Accordingly, the input port end of each switch is put in the HIGH-level when the switch is turned off, and put in the LOW-level when the switch is turned on. The microcomputer MC detects the level state of each switch to discriminate the ON-/OFF state of the switch.

The light/distance measurement circuit AFE measures the brightness of the object and the distance to the object in accordance with commands of the microcomputer MC and sends measured results to the microcomputer MC.

The motor M1 is adopted for changing the focal length of the taking lens. The motor M2 is adopted for winding or rewinding the film. When the motor M1 is driven in the normal direction, the movable lens is moved to the telephoto stop position. When the motor M1 is driven in the reverse direction, the movable lens is moved to the standard stop position. Also, when the motor M2 is driven in the normal direction, the film is wound. When the motor M2 is driven in the reverse direction, the film is rewound.

The motors M3, M4 are bipolar-driven stepping motors of two-phase-excitation type. When the stepping motor M3 is driven in the normal direction, a focusing lens is moved forward. When the stepping motor M3 is driven in the reverse direction, the focusing lens is returned to an original position. When the stepping motor M4 is driven in the normal direction, a shutter is opened. When the stepping motor M4 is driven in the reverse direction, the shutter is closed.

The motors M1, M2, and the stepping motors M3, M4 communicate with the microcomputer MC through the interface unit IF. The interface unit IF consists of interface members IF1, IF2, IF3, and IF4 which will be described below.

The interface member IF1 is adopted for controlling the focal length change motor M1. The interface member IF1 combines outputs from output ports ST1, ST2 of the microcomputer MC to drive the motor M1 in the normal direction or the reverse direction to brake the rotation of the motor M1, or suspend the electric flow to the motor M1.

The interface member IF2 is adopted for controlling the film winding/rewinding motor M2. The interface member IF2 combines outputs from output ports WND1, WND2 of the microcomputer MC to drive the motor M2 in the normal direction or the reverse direction to brake the rotation of the motor M2, or suspend the electric flow to the motor M2.

The interface member IF3 is adopted for controlling the stepping motor M3. The interface member IF3 controls the stepping motor M3 in accordance with outputs from output ports STM1, STM2, STM3 of the microcomputer MC. Specifically, the output port STM1 is used for changing the direction of electric current flowing to a first coil L1 of the stepping motor M3. The output port STM2 is used for changing the direction of electric current flowing to a second coil L2 of the stepping motor M3. The output port STM3 is used for suspending the electric currents flowing to the coils L1, L2.

The interface member IF4 is adopted for controlling the stepping motor M4. The interface member IF3 controls the stepping motor M4 in accordance with outputs from output ports STM4, STM5, STM6 of the microcomputer MC. Specifically, the output port STM4 is used for changing the direction of electric current flowing to a first coil L3 of the stepping motor M4. The output port STM5 is used for changing the direction of electric current flowing to a second coil L4 of the stepping motor M4. The output port STM6 is used for suspending the electric currents flowing to the coils L3, L4.

Figure 4A:
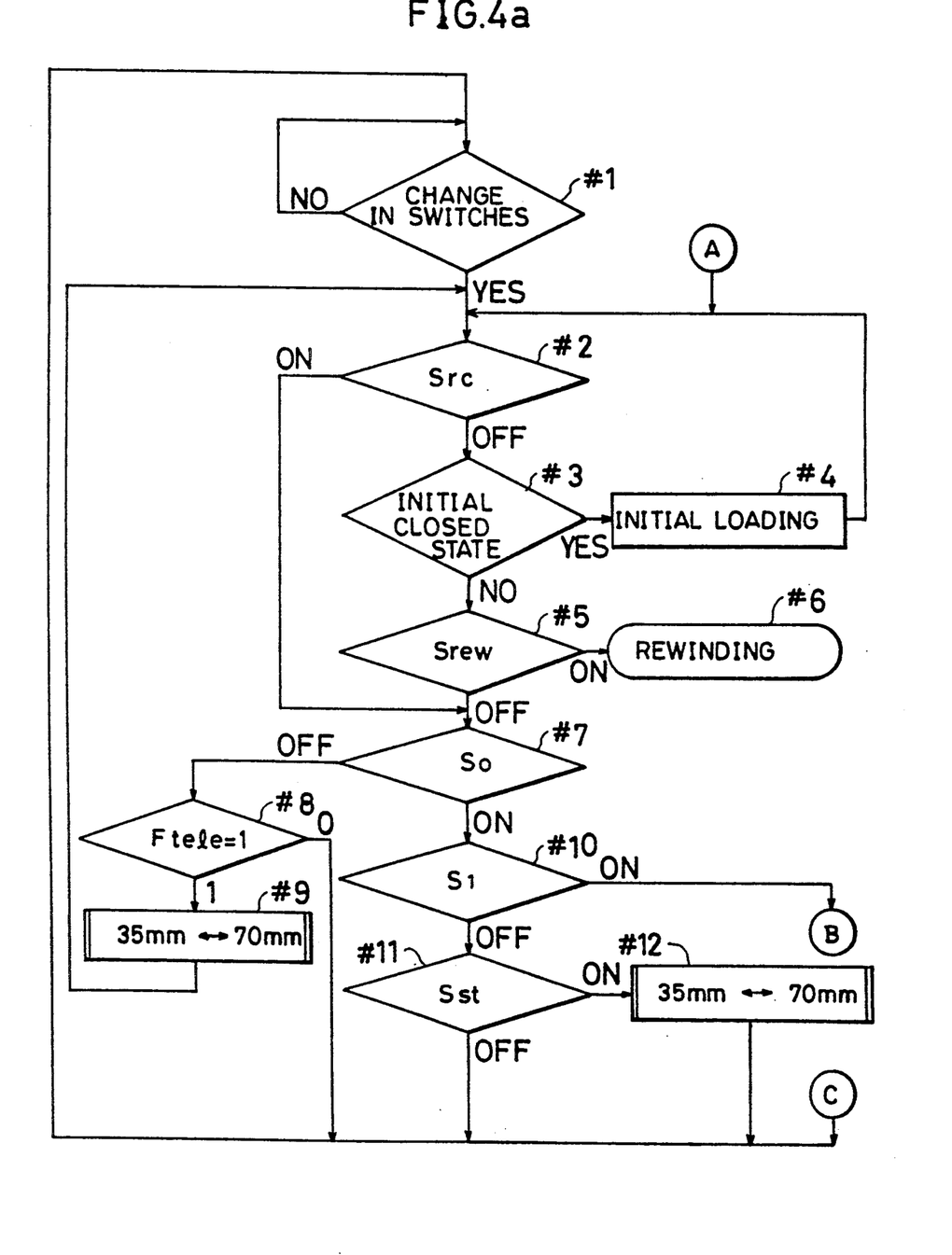
FIGS. 4a and 4b are flowcharts combinedly showing a mainsequence of the camera, circled A, B, C in FIG. 4a being respectively connected with circled A, B, C in FIG. 4b.
Figure 4B:
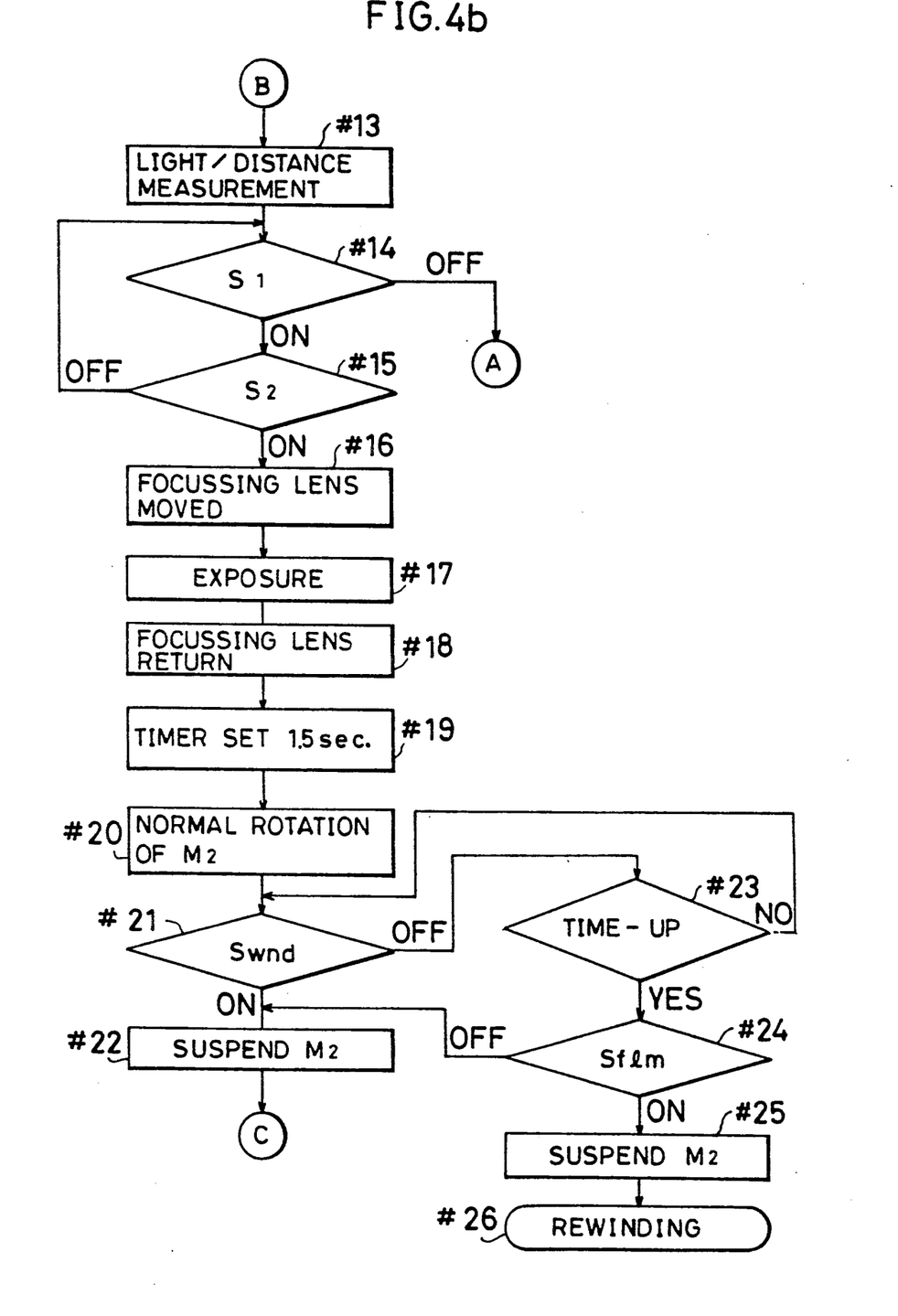

A photography main sequence of the camera will be described below with reference to FIGS. 4a and 4b.

When the camera is not put in any operation, the sequence is held at Step #1 at which it is discriminated whether any change occurs in the input ports to which the switches are respectively connected. When any change occurs, the sequence advances to Step #2. When no change occurs, the above-mentioned discrimination is repeated.

At Step #2, it is discriminated whether the rear cover is opened or the rear cover switch Src is turned on. When the rear cover is opened, i.e., the rear cover switch Src is turned on, the sequence advances to Step #7. When the rear cover is closed, i.e., the rear cover switch Src is turned off, the sequence advances to Step #3 at which it is discriminated whether the closed-state is produced immediately after the camera is loaded with a film, that is, whether it is an initial closed state.

When it is YES at Step #3, i.e., the closed-state is produced immediately after loaded with the film, the sequence advances to Step #4 at which initial loading operation of the film is practiced and then returns to Step #2. When it is NO at Step #3, i.e., the closed state is not produced immediately after loaded with the film, the sequence advances to Step #5 at which it is discriminated whether the rewinding switch Srew is turned on.

When the rewinding switch Srew is turned on, the sequence advances to Step #6 at which rewinding operation of the film is practiced. When the rewinding switch Srew is not turned on, the sequence advances to Step #7 at which it is discrimated whether the lens barrier switch So is turned off.

When the lens barrier switch So is turned off, the sequence advances to Step #8 at which it is discriminated whether the movable lens is set at the telephoto stop position. The discrimination is practiced based on whether a focal length change flag Ftele is "1". When the movable lens is at the telephoto stop position, the flag is set at "1". When the movable lens is at the standard stop position, the flag is set at "0".

When the flag is "1" at Step #8, i.e., the movable lens is set at the telephoto stop position, the sequence advances to Step #9 at which a focal length change subsequence is carried out and then returns to Step #2. The focal length change subsequence will be described later. When the flag is "0" at Step #8, i.e., the movable lens is set at the standard stop position, the sequence returns to Step #1 without changing the focal length of the taking lens. At Step #1, then, it is checked whether there is any change in the switches.

When the lens barrier switch So is turned on, i.e., the lens barrier is opened, the sequence advances to Step #10 at which it is discriminated whether the light/distance measurement switch S1 is turned on.

When the light/distance measurement switch S1 is turned off, the sequence advances to Step #11 at which it is discriminated whether the focal length change switch Sst is turned on.

When the focal length change switch Sst is turned on, the sequence advances to Step #12 at which the focal length change subsequence is then carried out. Thereafter, the sequence returns to Step #1. When the focal length change switch Sst is turned off, the sequence returns directly to Step #1.

When the light/distance measurement switch S1 is turned on, the sequence advances to Step #13 at which the light/distance measurement is practiced.

Subsequently, the sequence advances to Step #14 at which it is also discriminated whether the light/distance measurement switch S1 is turned on. When the light/distance measurement switch S1 is turned off, the sequence returns to Step #2.

When the light/distance measurement switch S1 is turned on, the sequence advances to Step #15 at which it is discriminated whether the release switch S2 is turned on. When the release switch S2 is in the OFF-state, the sequence advances to Step #14. The sequence repeats the discriminations of Steps #14, #15 until the release switch S2 is turned on. When the the light/distance measurement switch S1 is turned off, the sequence returns to Step #2 and repeats the above-mentioned steps.

When the release switch S2 is turned on, the sequence advances to Step #16 at which the focusing lens is moved forward in accordance with distance data obtained at Step #13. The sequence advances then to Step #17 at which exposure is practiced in accordance with light data obtained at Step #13. After the exposure is completed, the sequence advances to Step #18 at which the focusing lens is returned to the original position and then advances to Step #19 at which a timer is set at 1.5 seconds and then started. The timer issues a time-up signal after the lapse of 1.5 seconds.

Simultaneously, at Step #20, the motor M2 is driven in the normal direction to wind the film. At Step #21, it is discriminated whether the winding switch Swnd is turned on. At Step #23, it is discriminated whether the timer issues a time-up signal. When the winding switch Swnd is turned on before the timer issues the time-up signal, i.e., the winding switch Swnd is turned on at Step #21, in other words, the film is wound one frame, the sequence advances to Step #22 at which the motor M2 is then suspended and returns to Step #1. When the timer issues the time-up signal before the winding switch Swnd is turned on, i.e., the timer issues the time-up signal at Step #23, in other words, the time of 1.5 seconds elapse without winding the film one frame, the sequence advances to Step #24 at which it is discriminated whether the film detection switch Sflm is turned on to confirm the presence of the film.

When the film detection switch Sflm is turned on, in other words, it is meant that the film is wound by the tail portion, the sequence advances to Step #25 at which the motor M2 is suspended and then advances to Step #26 at which a film rewinding subsequence is carried out. The rewinding subsequence will be described later. When the film detection switch Sflm is turned off, in other words, it is meant that the camera is loaded with no film, the sequence returns to Step #22 and returns to Step #1.

In this mainsequence, the timer is set at the time of 1.5 seconds to detect a tail portion of the film. However, it should be noted that an appropriate time is set in accordance with winding mechanisms of cameras. It should be noted that the time of 1.5 seconds is mentioned as one example.

Figure 5:
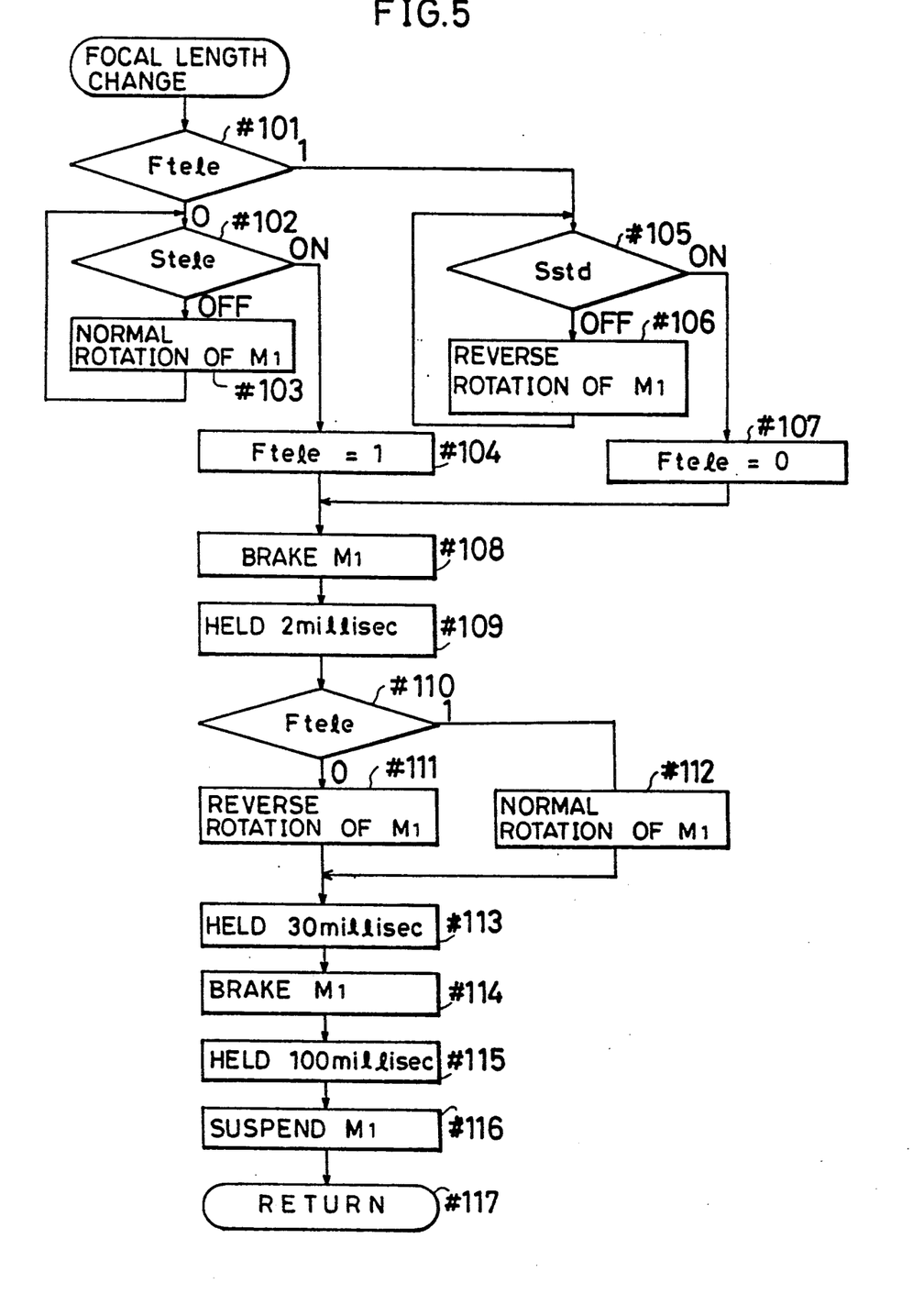
FIG. 5 is a flowchart showing a focal length change subsequence of the camera.

The focal length change subsequence will be described with reference to FIG. 5. At Step #101, it is discriminated whether the focal length change flag is "0". When the flag is "0", i.e., the movable lens is set at the standard stop position, the motor M1 is turned so as to move the movable lens from the standard stop position to the telephoto stop position. Specifically, the subsequence advances to Steps #102, #103 at which the motor is driven in the normal direction until the telephoto stop position detection switch Stele is turned on.

When the movable lens is set at the telephoto stop position, i.e., the telephoto stop position detection switch Stele is turned on at Step #102, the subsequence advances to Step #104 at which the flag is set at "1". At Step #108, then, braking of the motor M1 is started. The braking is held for 2 milliseconds at Step #109.

However, it should be noted that the movable lens can not be stopped immediately after the motor is braked due to the inertial force of the movable lens. Accordingly, it could be seen that the movable lens is liable to rebound at the telephoto stop position and then move back a little to the standard stop position.

For this reason, it is discriminated at Step #110 whether the focal length change flag is "1" in order to determine which direction the motor M1 is required to drive in. The motor M1 is driven in the reverse direction at Step #111 and in the normal direction at Step #112.

In this subsequence in which the flag is set at "1" at Step #104, the subsequence advances to Step #112 at which the motor M1 is driven in the normal direction so as to move the movable lens to the telephoto stop position. The driving of the motor M1 is held for 30 milliseconds at Step #113. The motor M1 is braked at Step #114. The braking is held for 100 milliseconds at Step #115. At Step #116, the electric flow to the motor M1 is suspended. Then, the subsequence returns to the main sequence at Step #117.

In the case of moving the movable lens from the telephoto stop position to the standard stop position, similar subsequence is carried out. When the focal length change flag is "1", it is meant that the movable lens is set at the telephoto stop position. Accordingly, the motor M1 is turned so as to move the movable lens from the telephoto stop position to the standard stop position. Specifically, the subsequence advances to Steps #105, #106 at which the motor M1 is driven in the reverse direction until the standard stop position detection switch Sstd is turned on.

When the movable lens is set at the standard stop position, i.e., the standard stop position detection switch Sstd is turned on at Step #105, the subsequence advances to Step #107 at which the flag is set at "0". At Step #108, then, braking of the motor M1 is started. The braking is held for 2 milliseconds at Step #109.

However, the movable lens can not be stopped immediately after the motor is braked due to the inertial force of the movable lens. Consequently, the movable lens is liable to rebound at the standard stop position and then move back a little to the telephoto stop position.

Accordingly, it is discriminated at Step #110 whether the focal length change flag is "0" in order to determine which direction the motor M1 is required to drive in. In this subsequence in which the flag is set at "0" at Step #107, the subsequence advances to Step #111 at which the motor M1 is driven in the reverse direction so as to move the movable lens to the standard stop position. The driving of the motor M1 is held for 30 milliseconds at Step #113. The motor M1 is braked at Step #114. The braking is held for 100 milliseconds at Step #115. At Step #116, the electric flow to the motor M1 is suspended. Then, the subsequence returns to the main sequence at Step #117.

It should be noted that the distance in which the movable lens is moved at the re-driving of Steps #111, 112 is considerably small. Accordingly, it could be seen that rebounds of the movable lens are eliminated in the re-driving of 30 milliseconds and focal length change can be accurately carried out.

Also, it should be noted that the times which are set at Steps #109, #113, and #115 are appropriately set in accordance with focal length change mechanisms. The above-mentioned times, 2 milliseconds at Step #109, 30 milliseconds at Step #113, and 100 milliseconds at Step #115, are mentioned as examples.

Next, the film rewinding subsequence will be described with reference to FIG. 6. The subsequence is started when the rewinding switch Srew is turned on, or the tail portion of the film is detected. At Step #201, it is discriminated whether the focal length change flag is "1".

When the flag is "1", i.e., the movable lens is set at the telephoto stop position, the subsequence advances to Step #202 at which the movable lens is returned to the standard stop position in accordance with the above-mentioned focal length change subsequence, and then advances to Step #203.

When the flag is "0", i.e., the movable lens is set at the standard stop position, the subsequence advances to Step #203.

At Step #203, it is started driving the motor M2 in the reverse direction to rewind the film. To check whether the rewinding operation is completed, at Step #204, it is discriminated whether the film detection switch Sflm is turned on. When the switch Sflm is in the ON-state, i.e., the rewinding operation is not completed, the discrimination of Step #204 is repeated until the film is almost completely rewound and the switch Sflm is turned off. Subsequently, the motor M2 is stopped at Step #205 and the rewinding operation comes to completion.

The subsequence advances to Step #206 at which it is repeated to discriminate whether the rear cover switch Src is turned on until the rear cover is opened. All the other switches are suspended until the rear cover switch Src is turned on. This suspension warns the user to unload the film from the camera.

When the rear cover is opened to unload the film, i.e., the rear cover switch Src is turned on, the subsequence returns to Step #2 of the main sequence.

Figure 6:
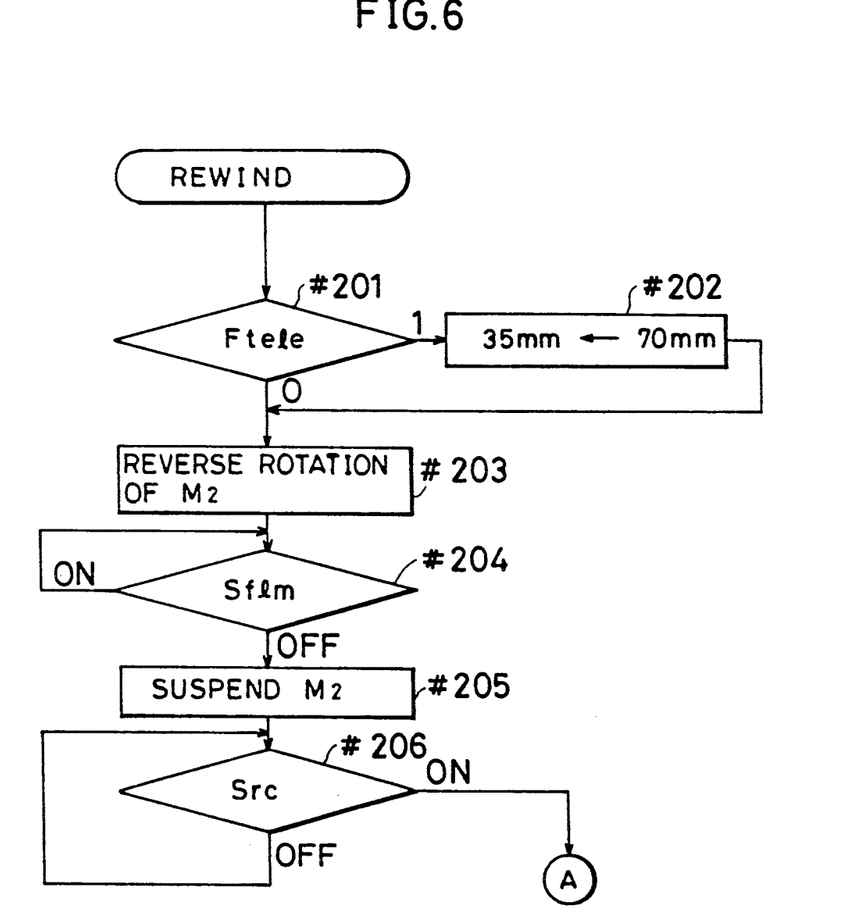
Figure 7:
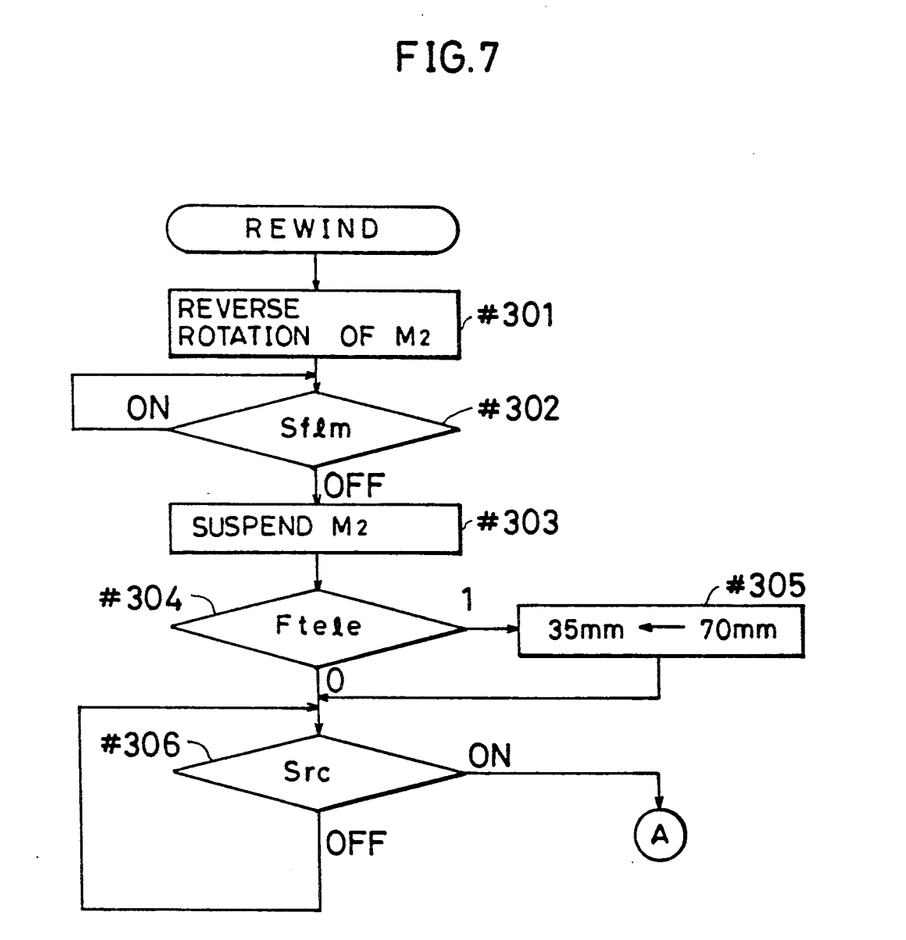

It should be noted that while the movable lens is moved before rewinding in the above-mentioned film rewinding subsequence, the movable lens may be moved after rewinding as another film rewinding subsequence shown in FIG. 7.

The operation of each step of the subsequence of FIG. 7 is the same as the subsequence of FIG. 6 except for a fact that in the subsequence of FIG. 7, Steps #201, #202 of the subsequence of FIG. 6 (i.e., the movable lens movement) and Steps #203, #204, #205 (i.e., the film rewinding) are replaced with one another.

In usual time, however, the subsequence of FIG. 6 is better than the subsequence of FIG. 7. This is because there is a likelihood in the sequence of FIG. 7 that the user is surprised at unexpectable movement of the movable lens after the rewinding operation is completed. In the case that the lens barrier is closed during the time that the rewinding operation is practiced, particularly, it is usual that the user does not expect the movable lens move after the lens barrier is closed. Accordingly, it is more preferable to move the movable lens before the rewinding operation is started than after the rewinding operation is completed.

As mentioned above, the subsequence of FIG. 6 or the subsequence of FIG. 7 makes the movable lens set at the standard stop position before the rewinding operation is started or after the rewinding operation is completed. Accordingly, it is not necessary to permit the focal length change when the rewinding operation is completed. Thus a simplified sequence can be provided. Also, the drawback can be eliminated which the movable lens moves in the state that photography is unexecutable. Consequently, the camera can be handled without involving uneasiness.

Furthermore, it would be understood that the foregoing relates to only the scope of the present invention is defined by the appended claims rather than by the description preceding them, and all changes that fall within meets and bounds of the claims, or equivalent of such meets and bounds are therefore intended to embraced by the claims.

What is claimed is:

1. A device for controlling a stop position of a movable member comprising:
    a movable member movable as far as a specified end position within a specified movable range,
    drive means for moving said movable member,
    detection means for detecting that said movable member reaches the specified end position of the specified movable range,
    timer means for setting a specified time, and
    control means responsive to said detection means for suspending said drive means when said movable member reaches the specified end position of the specified movable range, for setting said timer means at the specified time, and for then allowing said drive means to move the movable member again in the same direction as the preceding moving direction toward the specified end position until the set specified time elapses.

2. A device for controlling a stop position of a movable member cpmprising;
    a movable member movable within a specified movable range, said movable member being a part of a taking lens of a camera,
    drive for moving said movable member,
    detection means for detecting that said movable member reaches an end position of the specified movable range,
    timer means for setting a specified time, and
    control means responsive to said detection means for suspending said drive means when said movable member reaches the end position of the specified movable range, for setting said timer means at the specified time, and for then allowing said drive means to move the movable member again in the same direction as the preceding moving direction until the set specified time elapses.

3. A device according to claim 2 wherein said part of taking lens comprises a movable lens for changing the focal length of the taking lens.

4. A device according to claim 1 wherein said detection means includes an encoder.

5. A device according to claim 2 wherein said detection means includes an encoder.

6. A device for controlling a lens position of a camera comprising:
    a lens settable at one of a projected state and a retracted state,
    change means for changing said lens from said projected state to said retracted state and vice versa,
    discrimination means for discriminating whether said lens is set in said projected state,
    detection means for detecting that a loaded film is wound by the last photographic frame of the film, and
    control means responsive to said discrimination means and said detection means for controlling said change means so as to return said lens to said retracted state when said lens is set in said projected state and said loaded film is wound by the last photographic frame of the film.

7. A device according to claim 6 wherein said control means controls said change means so as to return said lens to said retracted state before rewinding of the wound film is started.

8. A device according to claim 6 or 7 wherein said projected state is a state in which said lens constitutes a telephoto focal length optical assembly and said retracted state is a state in which said lens constitutes a wide angle focal length optical assembly.

9. A device according to claim 6 or 7 wherein said projected state is a state in which said lens constitutes a telephoto focal length optical assembly and said retracted state is a state in which said lens constitutes standard focal length optical assembly.

10. A device according to claim 6 or 7 wherein said projected state is a state in which said lens is focused on an object at a close distance and said retracted state is a state in which said lens is focused on an object at an infinite distance.

11. A device for controlling a lens position of a camera comprising;
    a lens settable at one of a projected state and a retreacted state,
    change means for changing said lens from said projected state to said retracted state and vice versa,
    rewinding means for rewinding a film,
    discrimination means for discriminating whether said lens is set in said projected state, and
    control means responsive to said rewinding means and said discrimination means for controlling said change means so as to return said lens to said retracted state when said lens is set in said projected state and the film rewinding is started.

12. A device according to claim 11 further comprising detection means for detecting that a loaded film is wound by the last photographic frame, said rewinding means in response to said detection means starting rewinding of the film when the loaded film is wound by the last photographic frame.

13. A device according to claim 12 wherein said control means controls said change means so as to return said lens to said retracted state after said rewinding completely rewinds the loaded film.

14. A device according to claim 11, 12, or 13 wherein said projected state is a state in which said lens constitutes a telephoto focal length optical assembly and said retracted state is a state in which said lens constitutes a wide angle focal length optical assembly.

15. A device according to claim 11, 12, or 13 wherein said projected state is a state in which said lens constitutes a telephoto focal length optical assembly and said retracted state is a state in which said lens constitutes a standard focal length optical assembly.

16. A device according to claim 11, 12, or 13 wherein said projected state is a state in which said lens is focused on an object at a close distance and said retracted state is a state in which said lens is focused on an object at an infinite distance.

17. A device for controlling a lens position of a camera comprising:
a lens settable at one of a projected state and a retracted state,
change means for changing said lens from said projected state to said retracted state and vice versa,
rewinding means for rewinding a film,
discrimination means for discriminating whether said lens is set in said projected state, and
control means responsive to said rewinding means and said discrimination means for controlling said change means so as to return said lens to said retracted state before the film rewinding is started when said lens is set in said projected state.

18. A device for controlling a lens position of a camera comprising;
a lens movable between an extended position and a retracted position,
means for moving said lens between the two positions,
means for detecting a state that a photographing operation of the last photographic frame of a loaded film is completed, and
means, responsive to said detecting means, for controlling said moving means to move said lens to the retracted position when said detecting means detects the state.

19. A device according to claim 18 further comprising means for rewinding the film wherein said controlling means controls said moving means to move said lens to the retracted position before the film rewinding is started.

20. A device for controlling a lens position of a camera comprising;
a lens movable between an extended position and a retracted position,
means for moving said lens between the two positions,
means for feeding a photographic frame of a film at every photographing operation,
means for rewinding the film, and
means, responsive to said rewinding means, for controlling said moving means to move said lens to the retracted position when the film rewinding is started.

21. A device according to claim 20 further comprising means for detecting a state that a photographing operation of the last photographic frame of the loaded film is completed wherein said rewinding means starts rewinding of the film in response to said detecting means when said detecting means detects the state.

22. A device according to claim 21 wherein said controlling means controls said moving means to move said lens to said retracted position after said rewinding means completely rewinds the loaded film.

23. A device for controlling a lens position of a camera comprising;
a lens movable between an extended position and a retracted position,
means for moving said lens between the two positions,
means for feeding a photographic frame of a film at every photographing operation,
means for rewinding the film, and
means, reponsive to said rewinding means, for controlling said moving means to move said lens to the retracted position before the flim rewinding is started.

24. A device for controlling a lens position of a camera comprising;
a lens settable at least at one of a first position and a second position which is a further extended position from the first position,
means for moving said lens at least to one of the first position and the second position,
means for detecting a state that a photographing operation of the last photographic frame of a loaded film is completed, and
means, responsive to said detecting means, for controlling said moving means to move said lens to the first position when said detecting means detects the state.

25. A device for controlling a lens position of a camera comrpising;
a lens settable at least at one of a first position and a second position which is a further extended position from the first position,
means for moving said lens at least to one of the first position and the second position,
means for feeding a photograhic frame of a film at every photographing operation, p1 means for rewinding the film, and
means, responsive to said rewinding means, for controlling said moving means to move said lens to the first position when the film rewinding is started.

26. A device for controlling a lens position of a camera comprising;
a lens settable at least at one of a first position and a second position which is a further extended position for the first position,
means for moving said lens at least to the first position or the second position,
means for feeding a photographic frame of a film at every photographing operation,
means for rewinding the film, and means, responsive to said rewinding means, for controlling said moving means to move said lens to the first position before the film rewinding is started.

27. A device for controlling the position of a lens used in a camera wherein a recording means loaded in the camera records an image of an object, said device comprising;
a lens movable between an extended position and a retracted position,
means for moving said lens between the two positions, means for detecting a state that capacity of the recording means is not available for one further photographing operation, and means, responsive to said detecting means, for controlling said moving means to move said lens to the retracted position when said detecting means detects said state.

28. A device according to claim 27 wherein the recording means is a film.

29. A device for controlling the position of a lens used in a camera wherein a recording means loaded in the camera records and image of an object, said device comprising;

a lens settable at least at one of a first position and a second position which is a further extended position from the first position, means for moving said lens at least to one of the first position and the second position, means for detecting a state that capacity of the recording means is not available for one further photographing operation, and means, responsive to said detecting means, for controlling said moving means to move said lens to the first position when said detecting means detects said state.

30. A device according to claim 29 wherein the recording means is a film.

31. A controlling device used in a camera comprising;

means for determining an area desired to be obtained as a photograph in an opjective field, means for detecting a state that a photographing operation of the last photographic frame of a loaded film is completed, and means, responsive to said detecting means, for controlling said determining means so that a predetermined area is forcibly selected in the objective field when said detecting means detects said state.

32. A controlling device according to claim 31 wherein said determining means includes means for driving a lens within a specified movable range.

33. A controlling device used in a camera comprising;

means for determining an area desired to be obtained as a photograph in an objective field, means for feeding a photographic frame of a flim at every photographing operation, means for rewinding the film, and means, responsive to said rewinding means, for controlling said determining means so that a predetermined area is forcibly selected in the objective field when the film rewinding is started.

34. A controlling device according to claim 33 wherein said determining means includes means for driving a lens within a specified movable range.

35. A controlling device used in a camera comprising;

means for determining an area desired to be obtained as a photograph in an objective field, means for rewinding a film, means for feeding a photographic frame of the film at every photographing operation, and means, responsive to said rewinding means, for controlling said determining means so that a perdetermined area is forcibly selected in the objective field before the film rewinding is started.

36. A controlling device according to claim 35 wherein said determining means includes means for driving a lens within a specified movable range.

37. A controlling device used in a camera wherein a recording means loaded in the camera records an image of an object, said device comprising;

means for determining an area desired to be obtained as a photograph in an objective field, means for detecting a state that capacity of the recording means is not available for one further photographing operation, and means, responsive to said detecting means, for controlling said determining means so that a predetermined area is forcibly selected in the objective field when said detecting means detects said state.

38. A controlling device according to claim 37 wherein the recording means is a flim.

39. A controlling device according to claim 37 wherein said determining means includes means for driving a lens within a specified movable range.

40. A controlling device used in a camera comprising;

a lens, means for changing a focal length of said lens, means for detecting a state that a photographing operation of the last photographic frame of a loaded film is completed, and means, responsive to said detecting means, for controlling said changing means so as to set a predetermined focal length when said detecting means detects the state.

41. A controlling device according to claim 40 wherein said changing means includes means for driving said lens within a specified movable range.

42. A controlling device used in a camera comprising;

a lens, means for changing a focal length of said lens, means for feeding a photographic frame of a film at every photographing operation, means for rewinding the film, and means, responsive to said rewinding means, for controlling said changing means so as to set a predetermined focal length when the film rewinding is started.

43. A controlling device according to claim 42 wherein said changing means includes means for driving said lens within a specified movable range.

44. A controlling device used in a camera comprising;

a lens, p1 means for changing a focal length of said lens, means for feeding a photographic frame of a film at every photographing operation, means for rewinding the film, and means, responsive to said rewinding means, for controlling said changing means so as to set a predetermined focal length before the film rewinding is started.

45. A controlling device according to claim 44 wherein said changing means includes means for driving said lens within a specified movable range.

46. A controlling device used in a camera wherein a recording means loaded in the camera records an image of an object, said camera comprising;

a lens, means for changing a focal length of said lens, means for detecting a state that capacity of the recording means is not available for one further photographing operation, and means, responsive to said detecting means, for controlling said changing means so as to set a predetermined focal length when said detecting means detects the state.

47. A controlling device according to claim 46 wherein said changing means includes means for driving said lens within a specified movable range.

48. A controlling device according to claim 46 wherein the recording means is a film.

* * * * *

UNITED STATES PATENT AND TRADEMARK OFFICE
CERTIFICATE OF CORRECTION

PATENT NO. : 5,124,737
DATED : June 23, 1992
INVENTOR(S) : Manabu Inoue, et al.

It is certified that error appears in the above-identified patent and that said Letters Patent is hereby corrected as shown below:

In col. 11, line 15, before "move" insert --to--.

In col. 11, line 31, change "is" to --as--.

In col. 11, line 34, change "meets" to --metes--.

In col. 11, line 35, change "meets" to --metes--; and after "to" insert --be--.

In col. 12, line 6 (claim 3, line 1), after "of" insert --a--.

In col. 12, line 42 (claim 9, line 4), after "constitutes" insert --a--.

In col. 14, line 43 (claim 25, line 9), delete "p1".

In col. 14, lines 43 and 44 (claim 25, lines 9 and 10), "means for rewinding the film, and" should be a separate paragraph.

In col. 15, line 12 (claim 29, line 3), change "and" to --an--.

UNITED STATES PATENT AND TRADEMARK OFFICE
CERTIFICATE OF CORRECTION

PATENT NO. : 5,124,737

DATED : June 23, 1992

INVENTOR(S) : Manabu Inoue, et al.

It is certified that error appears in the above-identified patent and that said Letters Patent is hereby corrected as shown below:

In col. 16, line 41, (claim 44, line 2, delete "p1".

In col. 16, lines 41 and 42 (claim 44, lines 2 and 3), "means for changing a focal length of said lens," should be a separate paragraph.

Signed and Sealed this

Seventh Day of September, 1993

Attest:

BRUCE LEHMAN

*Attesting Officer*          *Commissioner of Patents and Trademarks*